US012380581B1

(12) United States Patent
Chen et al.

(10) Patent No.: US 12,380,581 B1
(45) Date of Patent: Aug. 5, 2025

(54) LOCALIZED DEPTH DISAMBIGUATION FOR TIME-OF-FLIGHT DATA

(71) Applicant: Zoox, Inc., Foster City, CA (US)

(72) Inventors: Yongzhe Chen, San Jose, CA (US); Venkata Subrahmanyam Chandra Sekhar Chebiyyam, San Francisco, CA (US); Samuel Russell Holladay, San Francisco, CA (US); Robert Nicholas Moor, San Mateo, CA (US); Jonathan Solheim, Santa Clara, CA (US); Shaminda Subasingha, San Ramon, CA (US); Wuyang Yu, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 423 days.

(21) Appl. No.: 18/078,582

(22) Filed: Dec. 9, 2022

(51) Int. Cl.
*G06T 7/55* (2017.01)
*B60R 11/00* (2006.01)
*B60W 60/00* (2020.01)
*G01S 7/4865* (2020.01)
*G01S 7/4915* (2020.01)
*G01S 17/89* (2020.01)
*G06T 7/521* (2017.01)

(52) U.S. Cl.
CPC .............. *G06T 7/55* (2017.01); *B60R 11/00* (2013.01); *G01S 7/4865* (2013.01); *G01S 7/4915* (2013.01); *G01S 17/89* (2013.01); *G06T 7/521* (2017.01); *B60W 60/001* (2020.02); *G06T 2207/10028* (2013.01); *G06T 2207/10144* (2013.01); *G06T 2207/20212* (2013.01); *G06T 2207/30241* (2013.01); *G06T 2207/30252* (2013.01)

(58) Field of Classification Search
CPC . G06T 7/55; G06T 7/521; G06T 2207/10028; G06T 2207/10144; G06T 2207/20212; G06T 2207/30241; G06T 2207/30252; B60R 11/00; G01S 7/4865; G01S 7/4915; G01S 17/89; B60W 60/001
See application file for complete search history.

(56) References Cited

U.S. PATENT DOCUMENTS

| | | | |
|---|---|---|---|
| 2017/0323472 A1* | 11/2017 | Barnes | G01C 19/5776 |
| 2022/0137218 A1* | 5/2022 | Onal | G01N 21/359 |
| | | | 356/4.01 |
| 2023/0314615 A1* | 10/2023 | Mlinar | G01S 17/89 |
| | | | 356/4.01 |
| 2024/0094390 A1* | 3/2024 | Bikumandla | G01S 7/4918 |

* cited by examiner

*Primary Examiner* — Amandeep Saini
*Assistant Examiner* — Andrew S Budisalich
(74) *Attorney, Agent, or Firm* — Lee & Hayes, P.C.

(57) ABSTRACT

Sensors, including time-of-flight sensors, may be used to detect objects in an environment. In an example, a vehicle may include a time-of-flight sensor that images objects around the vehicle, e.g., so the vehicle can navigate relative to the objects. Composite sensor data can be generated based on information from multiple exposures captured at different exposure times. In examples, a first depth determination technique is applied to a first subset of pixels and a second depth determination technique is applied to a second subset of the pixels. The first subset of pixels may correspond to pixels that are associated with a highly-reflective surface.

20 Claims, 5 Drawing Sheets

LOCALIZED DEPTH DISAMBIGUATION FOR TIME-OF-FLIGHT DATA

BACKGROUND

Time-of-flight sensors can generate both image (intensity) information and range (depth) information. Such sensors may be unreliable in certain environments, e.g., environments with varied lighting and/or environments with objects having different reflectivity. For example, conventional time-of-flight sensors may be more prone to erroneous depth determinations of some surfaces, such as highly reflective surfaces. These errors may result in unreliable data, increased processing time to better understand the data, and/or decreased efficiency in identifying and/or characterizing objects that may be potential obstacles to safe travel.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
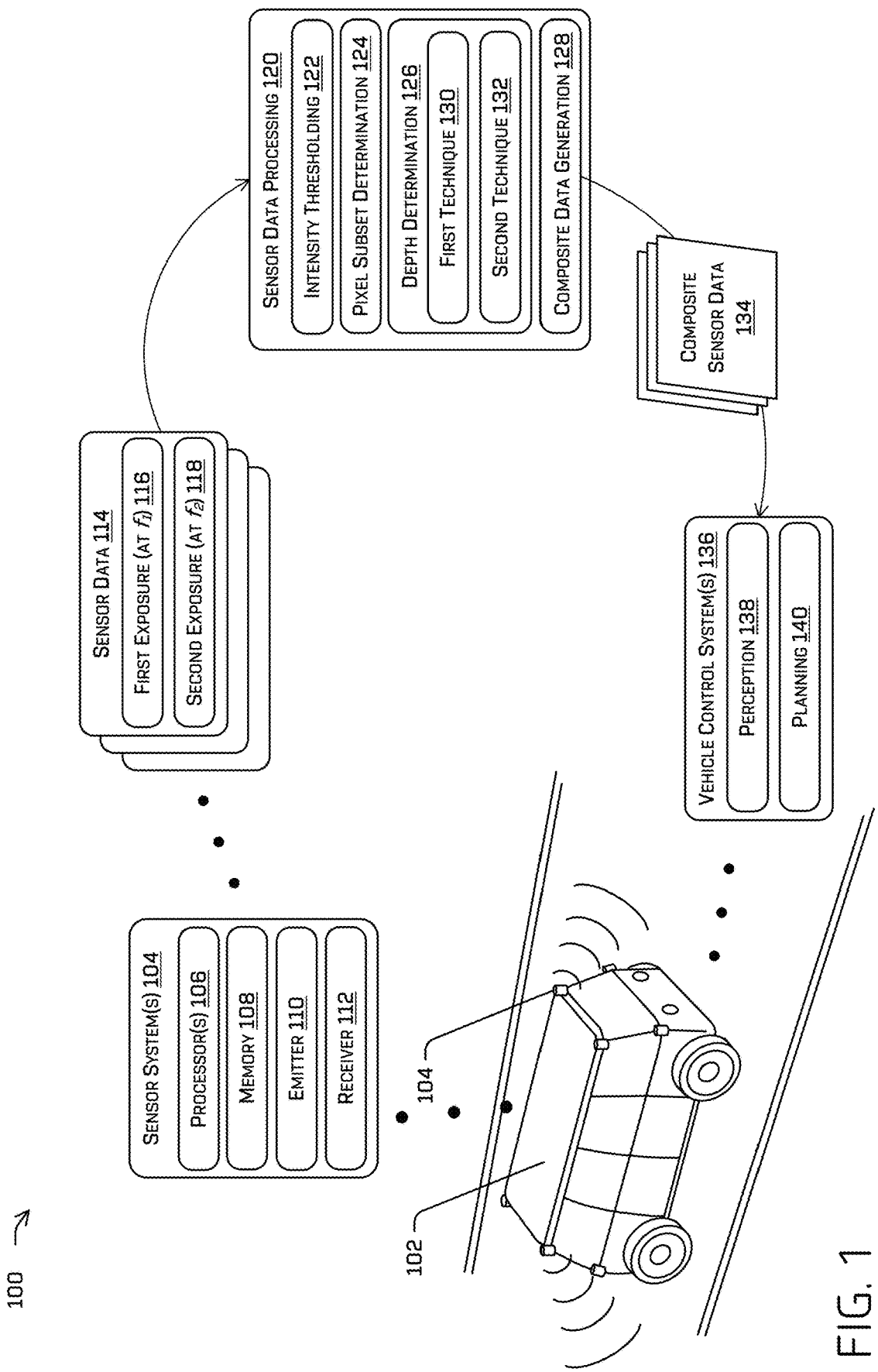
FIG. 1 is a schematic illustration showing an example vehicle, such as an autonomous vehicle, and example components and functionality of a sensor system associated with the vehicle, as described herein.

This disclosure describes methods, apparatuses, and systems for generating sensor data that can be used to identify objects in an environment and to control a vehicle relative to those identified objects. For example, an autonomous vehicle can include a plurality of sensors to capture sensor data corresponding to an environment of the vehicle. The sensor data can include data associated with the environment, which, in some instances, can include multiple objects (e.g., pedestrians, vehicles, bicyclists, etc.). Oftentimes, different sensor modalities are used for robustness purposes and/or because of inherent shortcomings in certain types of sensors. For example, time-of-flight sensors, relative to other sensor types, may generate sensor data more quickly and/or may be more reliable at shorter ranges. As a result of these characteristics, some vehicle implementations may use time-of-flight sensors in safety critical applications, e.g., to recognize objects in close proximity to the vehicle and/or to avoid imminent collisions. However, in some instances, intensity and distance information generated by time-of-flight sensors may be unreliable due to one or more of oversaturation, glare caused by highly reflective objects, pixel noise from stray light, under exposure, ambiguous returns, and/or the like. Techniques described herein can be used to improve sensor data, including time-of-flight sensor returns. For example, techniques disclosed herein may improve accuracy of depth measurements, including for returns associated with surfaces prone to improper depth measurements characterization in conventional systems. In some examples, the techniques disclosed herein may identify pixels that are likely to be mischaracterized, and perform additional or different depth disambiguation techniques on those pixels. Techniques described herein can also generate composite data from multiple exposures taken by a time-of-flight sensor and incorporating the depth measurements determined using the disparate disambiguation techniques. Generating composite sensor data according to techniques described herein can provide improved sensor data. Improved sensor data may result in a better understanding of the environment of the sensor, and, when the sensor is associated with a vehicle, techniques described herein can lead to safer navigation and/or more confident controlling of the vehicle.

As discussed herein, sensor data can be captured by one or more sensors, which can include time-of-flight sensors, RADAR sensors, LiDAR sensors, SONAR sensors, image sensors, microphones, or any combination thereof. The sensor can include an emitter to emit a signal and a receiver to receive a return signal from the environment. In the context of a time-of-flight sensor, the captured sensor data can be represented, for example, in a raw (e.g., a quadrature) format. In some instances, the sensor data in the quadrature format can include one or more pixels where each pixel can be represented as a numerical value (e.g., 12 bits with a value range of $2^{-11}$ to $(2^{11}-1)$). After determining the sensor data in the quadrature format, a sensor computing device (e.g., an FPGA, SoC, ASIC, CPU, etc.) can determine the sensor data in an intensity and depth format. In some instances, the intensity and depth format can include an intensity image and a depth image having, respectively, per-pixel intensity and depth values. In some implementations, the sensor computing device can also, using the sensor data in the intensity and depth format, perform an unprojection operation to determine the sensor data in an unprojected format to project each pixel in the sensor data into a multi-dimensional space (e.g., 3D-space using an x-position, a y-position, and a z-position).

In implementations described herein, a sensor, such as a time-of-flight sensor, can be configured to generate multiple exposures, including a first exposure and a second exposure. For instance, the different exposures can be captured at different exposure (or integration) times. In some examples, the first exposure is a short exposure, e.g., with a relatively shorter exposure time, and the second exposure is a long exposure, e.g., with a relatively longer exposure time. In other examples, the first exposure may be captured at a first illumination intensity and the second exposure may be captured at a second illumination intensity. For instance, the first exposure may be captured at a relatively lower illumination intensity than the second exposure. In examples, varying the exposure time may be useful to correct image data, e.g., to identify and/or replace saturated or overexposed pixels. Other parameters also are contemplated as varying between exposures. For instance, in aspects of this disclosure, the first exposure and the second exposure may be generated using different modulation frequencies.

Multiple exposures taken at different modulation frequencies can be used to disambiguate depth information, e.g., using depth determination techniques. For instance, depth information from a single exposure may include ambiguous depth values, e.g., representing some multiple of a nominal depth value. In some examples, the nominal depth value may be used as a default depth for pixels in time-of-flight sensors. In other examples, however, depth determination techniques can use information from two exposures, taken at two different modulation frequencies, to determine the depth. U.S. patent application Ser. No. 17/115,180, titled "Determining Depth Using Multiple Modulation Frequencies," and filed on Dec. 8, 2020, describes techniques for determining depth of pixels using depth data from two exposures taken at different modulation frequencies. Moreover, U.S. patent application Ser. No. 16/588,267, titled "Pixel Filtering Using Multiple Exposures," and filed Sep. 30, 2019, describes techniques for using multiple exposures from a time-of-flight sensor to generate filtered data. The disclosures of the '180 application and the '267 application are hereby incorporated by reference in their entirety for all purposes.

In conventional examples, a depth measurement technique is used to determine depths for all pixels in an image. For example, in some applications, the nominal depth values may be used as depths for all pixels. However, the nominal depth values may be unreliable in some instances. In other applications, the same disambiguation technique may be applied to all pixels. Disambiguation techniques may be more reliable, however disambiguating depths for all pixels may be resource intensive.

Aspects of this disclosure include selectively applying disambiguation techniques to subsets of pixels in a time-of-flight return. In some examples, the techniques described herein include determining high intensity pixels, e.g. from an intensity image. The high intensity pixels may correspond to pixels associated with emitted light reflection off a highly reflective object, e.g., a retroreflective surface. These high intensity pixels may be more prone to improper or erroneous depth measurements. The high intensity pixels may be determined globally, e.g., as pixels having a measured intensity above a threshold intensity, for example. In other instances, the high intensity pixels may be determined locally. Without limitation, pixel intensities may be compared on a line-by-line or column-by-column basis, with a pixel having the highest intensity or a pixel being above a threshold distance from an average intensity of pixels in the line/column being determined a high-intensity pixel.

Aspects of this disclosure may optionally include determining one or more additional pixels associated with the high intensity pixels. For example, these additional pixels may be pixels that neighbor or are in a proximity of the high intensity pixels. In examples, the additional pixels may be determined based at least in part on being within a threshold distance, e.g., two pixels, four pixels, or the like, of a high intensity pixel. In other examples, the additional pixels may be determined using other techniques, including but not limited to a fast marching method, or the like. The additional pixels may be associated with pixels that may be affected by glare, blooming, or the like when light is reflected off the highly reflective surface. The additional pixels may not directly correspond to the highly reflected surface.

Aspects of this disclosure also include applying a first depth determination technique 130 to the high intensity pixel(s). For example, the first depth determination technique 130 may be a disambiguation technique that uses first depth information from a first exposure (taken at a first modulation frequency) and second depth information from a second exposure (taken at a second modulation frequency. In examples, the first depth determination technique 130 can include a disambiguation technique that includes implementing the Chinese Remainer Theorem. Disambiguated depth values determined using the first depth determination technique 130 can be associated with the high intensity pixels. These disambiguated depth values may also be associated with the additional pixels described above.

Aspects of this disclosure also include determining, e.g., using a second depth determination technique 132, a measured depth for pixels other than the high intensity pixels (and other than the additional pixels, when determined). In some examples, the second depth determination technique 132 may include determining a nominal value of the pixels other than high intensity pixels. In other examples, the second depth determination technique 132 may include a disambiguation technique. The second depth determination technique 132 may be a technique such as that disclosed in U.S. patent application Ser. No. 17/115,180, titled "Determining Depth Using Multiple Modulation Frequencies." In examples, the second depth determination technique 132 may be relatively less resource intensive and/or may be less reliable than the first depth determination technique 130. Accordingly, in aspects of this disclosure, different depth determination techniques can be used on different groups of pixels. As a result, depth of pixels that are more prone to incorrect depth determination, e.g., pixels associated with highly-reflective surfaces, can be determined using a more reliable or other technique with higher certainty. However, the depth of other pixels may be determined using a second technique, which may be less reliable and/or have a lower certainty, but that may require fewer resources, or the like. Thus, aspects of this disclosure can include techniques for selectively "unwrapping" depth measurements generated by time-of-flight sensors.

Aspects of this disclosure also include generating composite sensor data based on the disambiguated depths determined for the high intensity pixels (and the additional pixels, when determined) and on the measured depths determined using the second depth determination technique 132. For example, this disclosure includes generating a depth map with depth pixels that correspond to either the depth determined using the first depth determination technique 130 (e.g., the disambiguated depth) or the depth determined using the second depth determination technique 132 (e.g., the measured depth). The composite data can include an intensity image and/or additional information generated by the time-of-flight sensor(s).

In some examples, composite data generated using the techniques described herein may be provided to, received by, or otherwise accessed by a computing device of an autonomous vehicle. For instance, the autonomous vehicle may use the image data to determine one or more trajectories for proceeding relative to objects determined from the composite data. In some instances, depth and/or intensity information identified according to techniques described herein may be combined, or fused, with data from other sensor modalities to determine the one or more trajectories.

Techniques described herein may be directed to leveraging sensor and perception data to enable a vehicle, such as an autonomous vehicle, to navigate through an environment while circumventing objects in the environment. Techniques described herein can utilize information sensed about the objects in the environment, e.g., by a time-of-flight sensor, to improve sensor data and more accurately determine features of the objects. For example, techniques described herein may be faster and/or more robust than conventional techniques, as they may increase the reliability of depth information, potentially alleviating the need for extensive post-processing, duplicate sensors, and/or additional sensor modalities. That is, techniques described herein provide a technological improvement over existing sensing, object detection, classification, prediction and/or navigation technologies. In addition to improving the accuracy with which sensor data can be used to determine objects and correctly characterize motion of those objects, techniques described herein can provide a smoother ride and improve safety outcomes by, for example, more accurately providing safe passage to an intended destination.

While this disclosure uses an autonomous vehicle in examples, techniques described herein are not limited application in autonomous vehicles. For example, any system in which inconsistent sensor data exists, e.g., caused at least in part by sensing highly reflective surfaces, may benefit from the techniques described. By way of non-limiting example, techniques described herein may be used on aircrafts, e.g., to correct intensities and/or depths associated with objects in an airspace or on the ground. Moreover, non-autonomous vehicles could also benefit from techniques described herein, e.g., for collision detection and/or avoidance systems. The techniques described herein may also be applicable to non-vehicle applications. By way of non-limiting example, techniques and implementations described herein can be implemented in any system, including non-vehicular systems, that generates, uses, and/or outputs sensor data, such as time-of-flight sensor data.

FIGS. 1-5 provide additional details associated with the techniques described herein.

FIG. 1 illustrates an example environment 100 through which an example vehicle 102 is traveling. The example vehicle 102 can be a driverless vehicle, such as an autonomous vehicle configured to operate according to a Level 5 classification issued by the U.S. National Highway Traffic Safety Administration. The Level 5 classification describes a vehicle capable of performing all safety-critical functions for an entire trip, with the driver (or occupant) not being expected to control the vehicle at any time. In such examples, because the vehicle 102 can be configured to control all functions from start to completion of the trip, including all parking functions, the vehicle may not include a driver and/or controls for manual driving, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 can be any configuration of vehicle, such as, for example, a van, a sport utility vehicle, a cross-over vehicle, a truck, a bus, an agricultural vehicle, and/or a construction vehicle. The vehicle 102 can be powered by one or more internal combustion engines, one or more electric motors, hydrogen power, any combination thereof, and/or any other suitable power source(s). Although the example vehicle 102 has four wheels, the systems and methods described herein can be incorporated into vehicles having fewer or a greater number of wheels, tires, and/or tracks. The example vehicle 102 can have four-wheel steering and can operate generally with equal performance characteristics in all directions. For instance, the vehicle 102 may be configured such that a first end of the vehicle 102 is the front end of the vehicle 102, and an opposite, second end of the vehicle 102 is the rear end when traveling in a first direction, and such that the first end becomes the rear end of the vehicle 102 and the second end of the vehicle 102 becomes the front end of the vehicle 102 when traveling in the opposite direction. Stated differently, the vehicle 102 may be a bi-directional vehicle capable of travelling forward in either of opposite directions. These example characteristics may facilitate greater maneuverability, for example, in small spaces or crowded environments, such as parking lots and/or urban areas.

A vehicle such as the example vehicle 102 can be used to travel through an environment and collect data. For example, the vehicle 102 can include one or more sensor systems 104. The sensor system(s) 104 can be, for example, one or more time-of-flight sensors, LiDAR sensors, RADAR sensors, SONAR sensors, image sensors, audio sensors, infrared sensors, location sensors, etc., or any combination thereof. Certain implementations described herein may be particularly well-suited for use with time-of-flight sensors, although other types of sensors also are contemplated. The sensor system(s) 104 may be disposed to capture sensor data associated with the environment. For example, the sensor data may be processed by a vehicle control system to identify and/or classify objects in the environment, e.g., trees, vehicles, pedestrians, buildings, road surfaces, signage, barriers, road marking, or the like and/or to navigate the vehicle 102 relative to such object(s).

As also illustrated in FIG. 1, the sensor system(s) 104 can include one or more processors 106 and memory 108 communicatively coupled to the processor(s) 106. The memory 108 can store processor-executable by the processor(s) 106 to cause the sensor system(s) 104 to perform functions including composite data generation from multiple exposures, as detailed herein. The processor(s) 106 and/or the memory 108 may be physically integrated into the sensor system(s), e.g., as an SoC, FPGA, ASIC, or the like, or, in some implementations, the processor(s) 106 and/or the memory 108 may be available to, e.g., connected to receive signals from and/or send signals to, the sensor system(s) 104. As discussed above, the sensor system(s) 104 can determine the sensor data in various formats (e.g., a quadrature format, an intensity and depth format, and/or an unprojected format) using the processor(s) 106.

The sensor system(s) 104 can also include an emitter 110 and a receiver 112. In the example of FIG. 1, the sensor system(s) 104 may include a time-of-flight sensor, and the emitter 110 may be configured to emit a carrier (e.g., a signal) and the receiver 112 may be configured to receive, e.g., capture, a response carrier (e.g., a response signal). The response carrier may be the carrier reflected off a surface in the environment. The time-of-flight sensor may be configured to determine sensor data in a quadrature format based on the carrier and the response carrier. In some instances, the sensor can measure a phase shift between the carrier and the response carrier and/or perform numerical integration calculation to determine the sensor data in the quadrature format (e.g., determining one or more of a quadrature from the response signal). In some implementations, the sensor can also determine an intensity and depth format of the sensor data, which may also be referred to as an intensity image and a depth image, respectively. For example, using the quadrature data, the sensor system can determine intensity values and depth values for each of a plurality of pixels representing a sensed environment and generate the intensity and depth images based on such values.

Aspects of the emitter 110 and/or aspects of the receiver 112 may be configurable. For instance, a modulation frequency and/or an intensity of the carrier emitted by the emitter 110 can be altered. For example, the illumination intensity associated with a carrier emitted by the emitter 110 can be altered by adjusting the voltage and/or frequency input to the emitter 110. Moreover, an integration or exposure time of the receiver 112 may be altered, e.g., by controlling an amount of time over which the receiver 112 collects response carriers. Altering the illumination power and/or the integration time can tune the sensor system(s) 104. For example, higher intensity illumination and/or longer integration times can result in increased performance in relatively lower ambient light environments and/or when the response carrier is from farther away objects and/or objects having lower reflectivity. Lower intensity illumination and/or shorter integration times can result in increased performance in relatively higher ambient light environments and/or when the response carrier is from relatively closer objects and/or objects having higher reflectivity.

As also illustrated in FIG. 1, the sensor system(s) 104 may be configured to output generated data as sensor data 114. For example, the sensor data 114 can include quadrature values, intensity and depth information, or the like. In the illustrated example, the sensor data 114 can include a first exposure 116 and a second exposure 118. As noted above, the emitter 110 emits a carrier and the receiver 112 receives a response carrier. In examples, the carrier may be amplitude-modulated light and the response carrier will have a phase shift relative to the carrier. Upon receipt at the receiver 112, the response carrier includes a phase value. Such values may be included in the first exposure 116 and/or the second exposure 118, e.g., as phase frames. In examples described herein, including below with reference to FIG. 2, the sensor system(s) 104 may compute intensity and/or depth values based at least in part on phase values of a plurality of phase frames.

In at least some examples, an instance of the sensor data 114 may include an exposure generated at a first modulation frequency, $f_1$, which may include an intensity image and/or a depth image, as the first exposure 116 and an exposure generated at a second modulation frequency, $f_2$, which may include intensity information and/or depth information, as the second exposure 118. As detailed further herein, the first exposure 116 may be associated with a first time, e.g., based on light collected during a first exposure time, and the second exposure 118 may be associated with a second time, e.g., based on light collected during a second exposure time before or after the first exposure time. In examples, the first time and the second time may be serially arranged or there may be a gap between the first time and the second time. In examples, the first exposure time may be equal to the second exposure time, but the exposures may be differentiated by the modulation frequency of the carrier signal. In other examples, the first exposure 116 and/or the second exposure 118 may be a combination of multiple exposures, e.g., a long exposure and a short exposure (generated at a shorter exposure time than the long exposure).

The first exposure 116 and the second exposure 118 may be generated based on serially-collected reflected light. Stated differently, the first exposure 116 may be associated with a first exposure time period and the second exposure 118 may be associated with an immediately adjacent, e.g., immediately before commencement of the first exposure time or immediately after a conclusion of the first exposure time. In some instances, the first exposure 116 and/or the second exposure 118 can include image frames including intensity and/or depth values calculated using the phase frames. Such image frames can include a stream of serially-generated (e.g., at a predetermined interval) image frames. Generally, each of the image frames may include the same type of data, e.g., data related to the intensity and/or depth for each of a plurality of pixels comprising the receiver of the sensor. Specifically, the image frames can include a depth image and an intensity image generated by the sensor system(s) 104 and representative of a portion of the environment 100. Similarly, other instances of the image frames can include both an intensity image and a depth image representative of the environment 100 at the corresponding sensing time.

Techniques described herein can use the first exposure 116 and the second exposure 118 to generate composite sensor data, e.g., a composite depth image and/or a composite intensity image, that provides a more robust image. For example, and as noted above, depth values in the first exposure 116 and depth values in the second exposure 116 may be ambiguous, and two (or more exposures) may be used to generate a disambiguated depth. The composite data allows downstream systems, e.g., planning systems, perception systems, or the like, to better understand a scene. In examples, the settings associated with the emitter 110 and/or the receiver 112 can be altered, e.g., to reduce the impact of environmental factors, including those just described, on pixel quality. Controlling aspects of the emitter 110 and/or the receiver 112 can provide an improved dataset that may better represent the environment and/or may have a higher associated confidence.

As illustrated in FIG. 1, a sensor data processing system 120 may be configured to receive the sensor data 114 generated by the sensor system(s) 104. In more detail, the sensor data processing system 120 can include an intensity thresholding component 122, a pixel subset determination component 124, a depth determination component 126, and a composite data generation component 128. For clarity, the sensor data processing system 120 (and its components) is illustrated separate from the sensor system(s) 104. However, portions of the sensor data processing system 120 may be implemented on the sensor system(s) 104. By way of non-limiting example, the processor(s) 106 may be configured to execute actions associated with the intensity thresholding component 122, the pixel subset determination component 124, the depth determination component 126, and/or the composite data generation component 128.

The intensity thresholding component 122 can include functionality to determine whether pixels, e.g., individual intensity pixels, have values equal to or above a threshold intensity value. For instance, the intensity thresholding component 122 can determine pixels in the first exposure 116 and/or pixels in the second exposure 118 that are high intensity pixels. In other examples, the intensity thresholding component 122 can determine pixels in a different exposure, e.g., a third exposure different from the first exposure 116 and the second exposure 118, that are high intensity pixels. In some examples, high-intensity pixels may be pixels with an intensity at or near a saturation value in some examples. The high intensity pixels may be pixels that are associated with highly reflective surfaces, such as retroreflective surfaces.

In some examples, the high intensity pixels may be determined in an exposure having a relatively low exposure time. For instance, the exposure time may be sufficiently low that very few or no pixels are expected to be saturated or overexposed. Instead, objects that are farther away and/or that have relatively lower reflective properties may not be detected in the exposure. Conversely, highly reflective objects, such as retroreflectors, will result in relatively higher intensity (but not saturated) pixels. Thus, the intensity thresholding component 122 can compare pixels in the shorter exposure to an intensity threshold that will identify those pixels that are likely associated with a highly-reflective object in the environment.

In some examples, the intensity thresholding component 122 can identify pixels in a relatively longer exposure that are equal to or above a threshold intensity. The threshold intensity to which the pixels in the longer exposure are compared may be different, e.g., higher, than the threshold to which the pixels in a relatively shorter exposure are compared. In examples, the intensity thresholding component 122 can determine those pixels in the relatively longer exposure that are saturated pixels. Thus, for example, the intensity thresholding component 122 can determine whether pixels in the relatively longer exposure have an intensity corresponding to a saturation value. In at least some examples, the sensor data 114 can include a saturation map that indicates pixels that are saturated in an exposure. In these examples, the intensity thresholding component 122 can also or alternatively determine from the saturation map pixels that are oversaturated.

As just described, the intensity thresholding component 122 can perform global intensity thresholding, e.g., by comparing pixels to a threshold, e.g., a same threshold for all pixels. In other examples, the intensity thresholding component 122 can perform local thresholding, e.g., by determining high intensity pixels from some subset of all pixels. For example, the intensity thresholding component 122 can analyze pixels on a line-by-line, column-by-column, or region-by-region basis. In such an analysis, the high intensity pixels may be identified as one or more pixels having an intensity higher than, e.g., by a threshold difference, other pixels in the line/column/region. In some examples, a pixel may be identified as a high intensity pixel upon determining that the intensity of that pixel meets or exceeds a threshold intensity above an average intensity of pixels in the line/column/region.

The pixel subset determination component 124 may be optionally included and generally includes functionality to identify additional pixels that are associated with the high intensity pixels. In examples, the pixel subset determination component 124 can receive an identification of the high intensity pixels and determine pixels proximate the high intensity pixels. In examples, the pixel subset determination component 124 can identify neighboring pixels of the high intensity pixels and/or pixels within a threshold distance of the high intensity pixels, e.g., within 2 pixels, 3 pixels, 5 pixels, or the like. The additional pixels may not be high intensity pixels, e.g., such that they would not be identified by the intensity thresholding component 122. In some examples, the additional pixels may correspond to pixels that may be affected by glare, blooming, or the like, caused by reflection off a highly-reflective surface.

In some examples, the pixel subset determination component 124 can implement one or more other processes to determine the additional pixels. For example, the pixel subset determination component 124 may implement a numerical method, such as a fast marching method. In a fast marching method, one or more of the high intensity pixels may be identified as seed area, and the method can determine an area around the high intensity pixel(s). In some examples, the pixel subset determination component 124 can implement the fast marching method based at least in part on depth information associated with the high intensity pixels and/or surrounding pixels. Thus, the high intensity pixels identified by the intensity thresholding component 122 and the (optional) additional pixels determined by the pixel subset determination may define pixels that are associated with a surface, such as a surface of a highly reflective surface, or the like.

The depth determination component 126 includes functionality to determine depths of pixels, e.g., from one or more of the exposures 116, 118. In some examples, the depth determination component 126 includes functionality to implement a first depth determination technique 130 on the high intensity pixels (and the (optional) additional pixels) and a second depth determination technique 132 on pixels other than the high intensity pixels (and the (optional) additional pixels). In some implementations, the first depth determination technique 130 can include a technique for determining a disambiguated depth for the high intensity pixels. For example, the first depth determination technique 130 can be based at least in part on the Chinese Remainder Theorem. For example, as discussed above, the first exposure 116 and the second exposure 118 may include first depth information captured at a first modulation frequency and second depth information captured at a second modulation frequency, respectively. The modulation frequencies may be chosen based on the maximum distance at which objects are expected to be. Thus, the depth information includes a nominal depth, which may be the true depth of the detected surface. However, because time-of-flight sensors emit carrier signals that repeat at a given period, the nominal depth may be a modulus associated with a phase shift. By way of non-limiting example, the modulation frequency of the time-of-flight sensor may be chosen to determine depths of up to 5 meters. Thus, a phase shift of 30-degrees may correspond to a 2-meter depth, for example. However, that 2-meters may be a modulus associated with the phase shift, and in fact, the distance may be 7-meters, or 12-meters, or 17-meters, or so forth.

The second exposure 118, captured at the second modulation frequency, will also return a nominal depth for each of the pixels. As just described, the nominal depth may be the actual depth or measured depth of the detected surface, or the nominal depth may be a modulus. Continuing the example above, the depth information associated with a pixel in the first exposure 116 may be the 2-meters determined using the modulation frequency associated with the maximum distance of 5-meters. The second depth information associated with the second exposure 118 may be determined based on a second modulation frequency that, in this example, corresponds to a maximum distance of 3 meters. The phase shift measured at the second modulation frequency may correspond to a distance of 1-meter. However, because of the ambiguity discussed above, that 1-meter may be a modulus, and thus the depth may be 1-meter, 4-meters, 7-meters, 10-meters, 13-meters, or so forth. Because both depth measurements, at the two modulation frequencies, have a candidate depth of 7-meters, but the other candidate depths do not align, techniques described herein determine the disambiguated depth to be 7-meters.

In practice, the first modulation frequency and the second modulation frequency may be chosen based on their associated maximum depths. For instance, by selecting two maximum depths that are coprime, e.g., 3 and 5 in the example above, depths up to the product of the two maximum depths (15-meters in the example) can be disambiguated. In other implementations in which coprime numbers are not used, the depth to which values can be disambiguated may correspond to the lowest common multiple of the two depths.

The depth determination component 126 can, using the first depth determination technique 130, a depth for each of the high intensity pixels (as well as the additional pixels, when determined). In other examples, a depth may be determined for fewer than all of the high intensity pixels, e.g., for as few as a single pixel of the high intensity pixels. In these examples, a depth may be associated with each of the high intensity pixels/additional pixels based at least in part on the disambiguated depth(s) determined for subset of the pixels.

The second depth determination technique 132 is a different technique used to determine depth values for the pixels that are not associated with the high intensity pixels, e.g., that are not the high intensity pixels, or the additional pixels associated with the high intensity pixels. For example, the depth determination component 126 can determine measured depths for the pixels that are not associated with the high intensity pixels by assigning a nominal depth, e.g., from the first exposure 116 or the second exposure 118 to the pixels. In examples, one of the modulation frequencies may be established such that a maximum (nominal) distance of the sensor is relatively large. Accordingly, objects are likely to be detected at their actual distances. Moreover, in some examples the exposure may be generated at a relatively short exposure time. Accordingly, relatively farther objects may be less likely to be detected and/or may have a relatively low intensity. In some examples, pixels below a threshold intensity may be determined to be outside the maximum nominal distance of the sensor. As will be appreciated, in the foregoing example, the depth determination component 126 may determine the measured depths of the non-high intensity pixels based on the nominal depth, e.g. from a single exposure.

In other examples, the second depth determination technique 132 can be a disambiguation technique. For instance, the second depth determination technique 132 can be a technique according to the disclosure of U.S. patent application Ser. No. 17/115,180, titled "Determining Depth Using Multiple Modulation Frequencies," which is incorporated by reference herein. For example, that application describes a technique in which a relatively lower modulation frequency is selected to provide a considerably larger nominal maximum depth than the nominal maximum depth associated with the relatively higher modulation frequency. In some examples, the higher modulation frequency may be on the order of three- to eight-times higher than the lower modulation frequency. For instance, the lower modulation frequency may be between about 3 MHz and about 5 MHz, which may provide a nominal maximum depth on the order of about 35 meters or more. The higher modulation frequency may be about 20 MHz or greater, which may provide a nominal maximum depth of 4 to 5 meters or less. The depth measurement from the lower modulation frequency exposure may be used as an estimated depth and the candidate depth from the high modulation frequency exposure closest to the estimated depth is used as the measured depth.

The first depth determination technique 130 may have a relatively high degree of certainty, e.g., higher than a degree of certainty associated with the second depth determination technique 132. However, the first depth determination technique 130 may be more resource intensive, relatively slower, and/or have other drawbacks. In contrast, the second depth determination technique 132 may be less resource intensive, be relatively faster, and/or have other advantages, but may have a lower degree of certainty. Accordingly, by applying the first technique 130 to pixels that are more prone to depth errors, the techniques described herein may provide improved depth detection at targeted areas or sections of pixels. Although in the foregoing examples the techniques described in U.S. patent application Ser. No. 17/115,180, titled "Determining Depth Using Multiple Modulation Frequencies," are described as being associated with the second technique 132, in other examples these techniques may be used by the depth determination component 126 as the first technique 130. As will be appreciated, aspects of this disclosure can include implementing different depth determination techniques for different pixels, e.g., for combining in a single depth image, regardless of which techniques are used.

The composite data generation component 128 includes functionality to generate composite sensor data 134 from the first exposure 116 and the second exposure 118, based on the depths determined by the depth determination component 126. In some examples, the composite data generation component 128 can generate a depth map as the composite sensor data 134. For example, the depth map may associate disambiguated depths determined using the first technique 130 with the high intensity pixels (and additional pixels associated with the high intensity pixels) and measured depths determined using the second technique 132 with pixels other than the high intensity pixels. The composite sensor data 134 can also include intensity information, e.g., determined based on the first exposure 116 and/or the second exposure 118 for each pixel.

As also illustrated in FIG. 1, the composite sensor data 134 may be transmitted to one or more vehicle control systems 136, e.g., for use in controlling the vehicle 102. By way of non-limiting example, the vehicle control system(s) 136 can include a perception system 138 and a planning system 140. In examples, the perception system 138 may receive the composite sensor data 134 and perform one or more of object detection, segmentation, and/or classification to determine objects represented therein. The planning system 140 may determine a trajectory or route for the vehicle 102, e.g., relative to objects perceived by the perception system 138 from the composite sensor data 134.

Providing the vehicle control system(s) 136 with the composite sensor data 134 can improve safety outcomes, e.g., relative to providing the vehicle control system(s) 136 with the first exposure 116, the second exposure 118, and/or blended information from the first exposure 116 and the second exposure 118. In at least some examples, time-of-flight sensors may be used on vehicles, such as the vehicle 102, to provide critical information about objects immediately surrounding the vehicle 102. Thus, providing the composite sensor data 134 with improved depth determination can streamline processing, further increasing the speed at which these critical functions can be performed.

Figure 2:
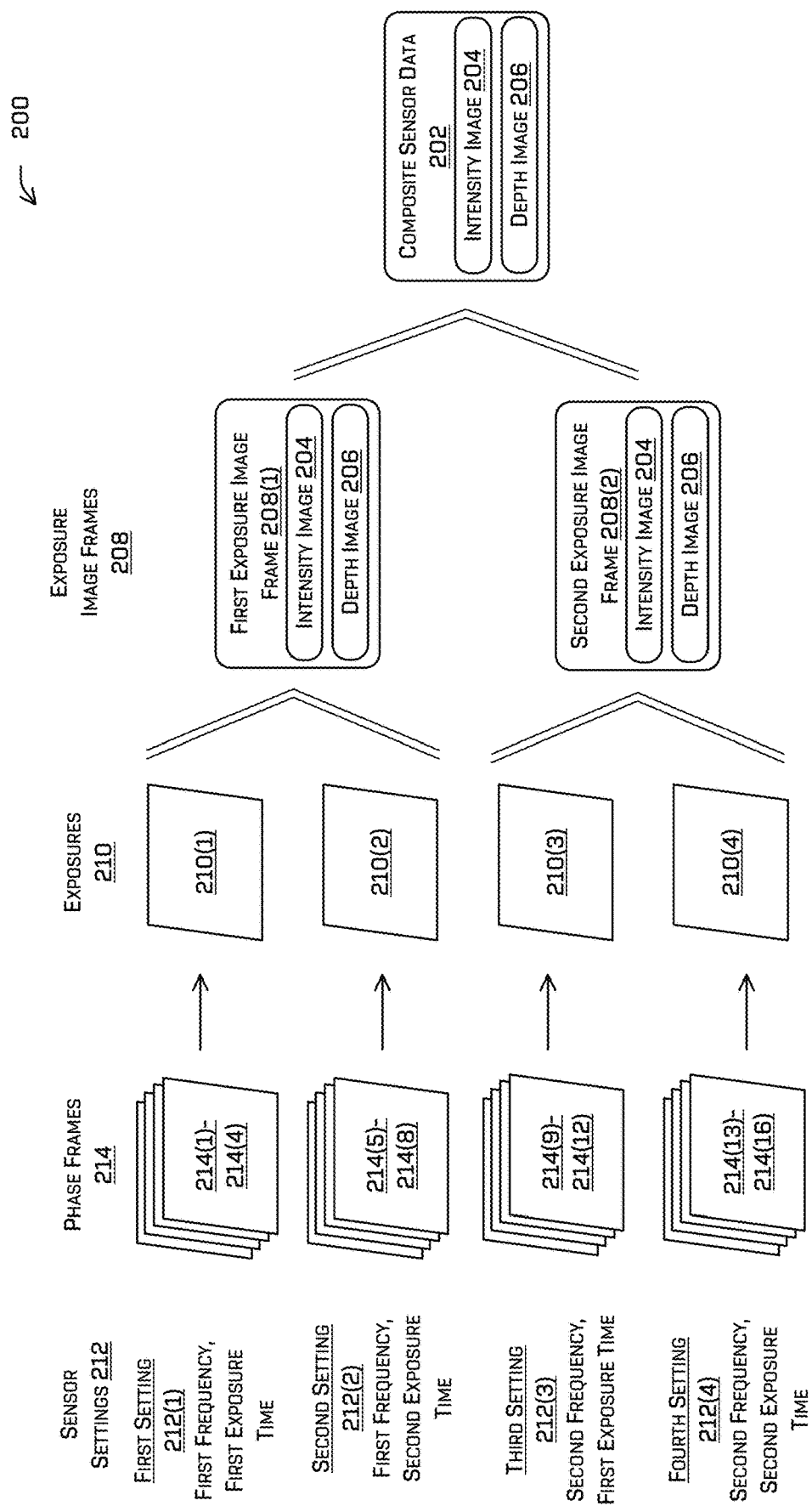
FIG. 2 is a schematic diagram illustrating aspects of sensor data generation at a sensor, such as a time-of-flight sensor, as described herein.

FIG. 2 is a schematic diagram 200 illustrating aspects of a sensor system, such as the sensor system(s) 104 described above. More specifically, the diagram 200 illustrates aspects of data capture conceptualizing how different types of data, in particular composite sensor data 202 may be generated by the sensor, which may be a time-of-flight sensor. In this example, the composite sensor data 202 includes an intensity image 204 and a depth image 206. The intensity image 204 can include per-pixel intensity values, and the depth image 206 can include per-pixel depth values. For instance, positions of the pixels can correspond to pixel position in the receiver 112 of the sensor system(s) 104 discussed above. Although illustrated as including only the intensity image 204 and the depth image 206, the composite data 202 can include additional information, including but not limited to reflectivity information and/or confidence information. The illustrated composite data 202 may be the composite sensor data 134, discussed above in connection with FIG. 1.

As illustrated, the composite data 202 can be generated from one or more exposure image frames 208. In the illustration, the exposure image frames 208 include a first exposure image frame 208(1) and a second exposure image frame 208(2). In this example, the first exposure image frame 208(1) may correspond to the first exposure 116, discussed above, and the second exposure image frame 208(2) may correspond to the second exposure 118. Although two exposure image frames are illustrated, more or fewer may be used in examples described herein to generate the composite data 202.

In examples, each of exposure image frames 208 can be generated from a plurality of exposures 210. In the illustration, the exposures 210 include a first exposure 210(1), a second exposure 210(2), a third exposure 210(3), and a fourth exposure 210(4). In this example, the first exposure image frame 208(1) is generated based at least in part on the first exposure 210(1) and the second exposure 210(2), and the second exposure image frame 208(2) is generated based at least in part on the third exposure 210(1) and the fourth exposure 210(4). As also illustrated, each of the exposures 210 may correspond to different sensor settings 212. In FIG. 2, the sensor settings 212 include a first setting 212(1) having a first modulation frequency and a first exposure time, a second setting 212(2) having the first modulation frequency and a second exposure time, a third setting 212(3) having a second modulation frequency (different from the first modulation frequency) and the first exposure time, and a fourth setting 212(4) having the second modulation frequency and the second exposure time. Although the settings 212 are illustrated has having various exposure times, in other examples a similar effect may result from changing an illumination power or intensity. In examples, the first exposure 210(1) and the second exposure 210(2) are captured using the same (first) modulation frequency, but one is a long exposure and the other is a short exposure. Similarly, the third exposure 210(3) and the fourth exposure 210(4) are captured using the same (second) modulation frequency, but one is a long exposure and the other is a short exposure. Combining the long and short exposures, e.g., as the first exposure image frame 208(1) and the second exposure image frame 208(2) has benefits for intensity data. For example, long exposures may provide better image quality, but certain objects, e.g., highly reflective objects, often result in overexposed or saturated pixels in those long exposures. Data from the short exposure may be used to substitute or correct such unreliable pixels. However, because the first exposure image frame 208(1) and the second exposure image frame 208(2) are determined based on exposures 210 having the same modulation frequency, the depth image in those exposure frames may be ambiguous. Accordingly, combining the first exposure image frame 208(1) and the second exposure image frame 208(2) may allow for depth disambiguation, e.g., using the first technique 130 and/or the second technique 132.

As also illustrated in FIG. 2, each of the exposures 210 may be based at least in part on a plurality of phase frames 214. More specifically, the phase frames 214 may include the raw data, e.g., a phase value of the return carrier, received at the sensor. In the example, each of the exposures 210 may be based on four phase frames. In the example, the first exposure 210(1) is generated from the phase frames 214(1)-214(4), the second exposure 210(2) is generated from the phase frames 214(5)-214(8), and so forth. In examples, the phase frames 214 are used to model the return carrier and a correlation function may be generated based on the carrier and the model. The four values associated with phase frames are four points on the correlation function. Although FIG. 2 illustrates that each of the exposures 210 is generated from four of the phase frames 214, more or fewer (e.g., as few as two) phase frames 214 may be used in implementations.

Accordingly, FIG. 2 illustrates that the composite sensor data 202, which may be the composite sensor data 134, includes an intensity image 204 and/or a depth image 206 and can be generated from a plurality of serially-captured exposures (e.g., the exposures 210) and/or the exposure image frames 208 generated from the exposures 210. As will also be appreciated, because the exposure 210 (and the exposure image frames 208) are generated at different times, pixel offset between the exposures 210 and/or between the exposure image frames 208 may occur, as detailed herein. The composite sensor data 202, using the techniques detailed herein, may correct for these offsets.

Figure 3:
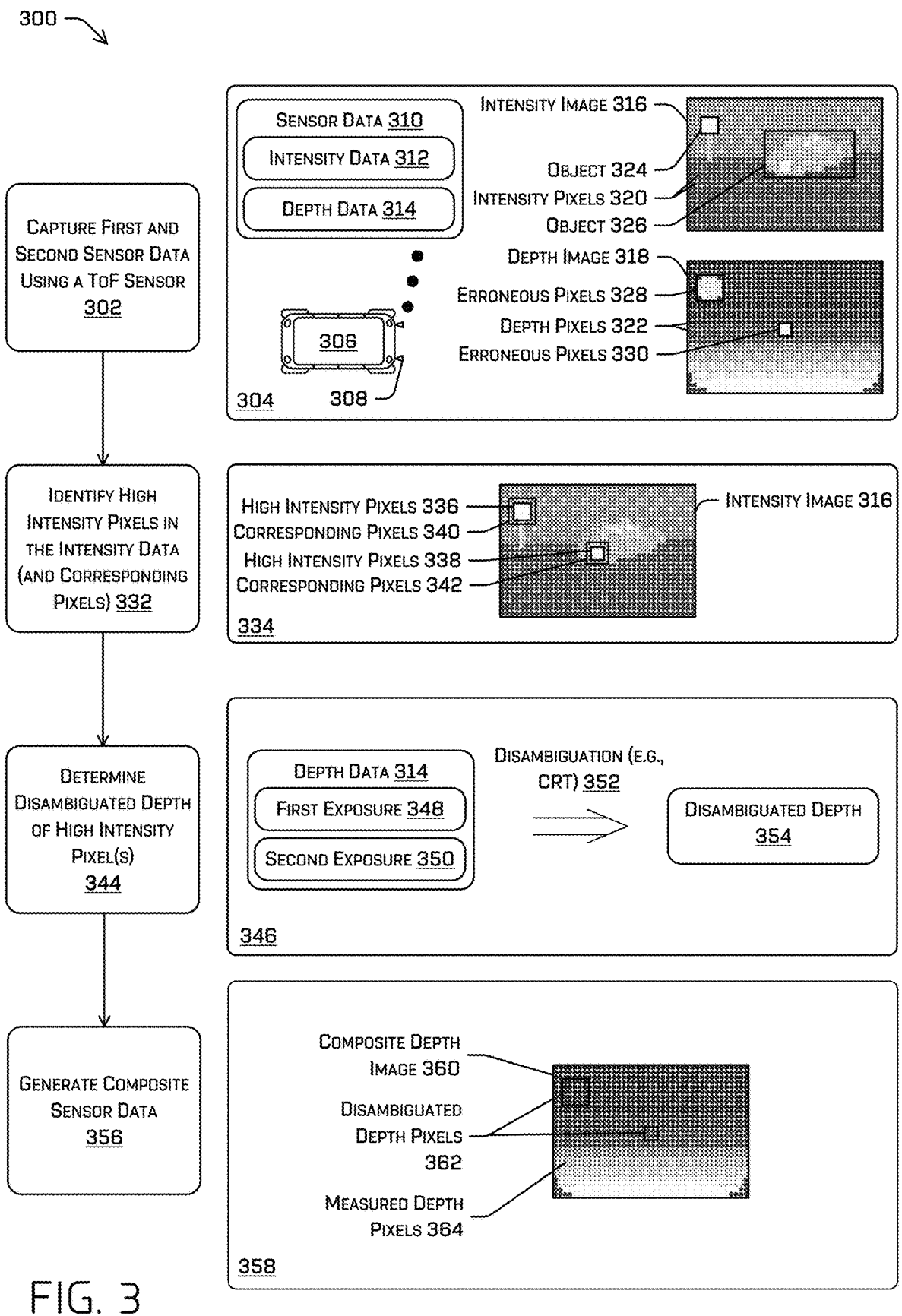
FIG. 3 is a pictorial flow chart illustrating aspects of composite sensor data generation at a sensor, such as a time-of-flight sensor, as described herein.

FIG. 3 includes textual and graphical flowcharts illustrative of a process 300 for generating composite data from multiple exposures of a time-of-flight sensor, according to implementations of this disclosure. For example, the process 300 can be implemented using components and systems illustrated in FIG. 1 and described above, although the process 300 is not limited to being performed by such components and systems. Moreover, the components and systems of FIG. 1 are not limited to performing the process 300.

In more detail, the process 300 can include an operation 302 that includes capturing first and second sensor data using a time-of-flight sensor. As noted above, techniques described herein may be particularly applicable to use with time-of-flight sensors, and the example of FIG. 3 uses time-of-flight sensors as one specific example. The disclosure is not limited to use with time-of-flight sensors, as techniques described herein may be applicable to other types of sensors that may produce saturated pixels or are otherwise effected by overexposure. In some examples, the operation 302 can include receiving both depth and intensity data measured by the time-of-flight sensor and/or multiple exposure generated by the time-of-flight sensor.

An example 304 accompanying the operation 302 illustrates a vehicle 306, which may be the vehicle 102 in some examples. One or more time-of-flight sensors 308 are mounted on the vehicle 306, e.g., to sense an environment surrounding the vehicle 102. For instance, the time-of-flight sensor(s) 308 may be arranged to sense objects generally in a direction of travel of the vehicle 306, although the sensors may be otherwise disposed and more or fewer sensors than the two illustrated may be present. As noted above, the time-of-flight sensor(s) 308 may be specifically configured to detect objects relatively close to the vehicle 306. The time-of-flight sensor(s) 308 may be configured to generate sensor data 310, including intensity data 312 and depth data 314. In examples, the sensor data 310 can include a plurality of exposures, like the exposures 116, 118, described above, with individual of the exposures including one or both of instances of the intensity data 312 and the depth data 314. A first exposure may be generated at a first modulation frequency and a second exposure may be generated at a second modulation frequency, as described above. For instance, a first exposure of the sensor data 310 may correspond to the first exposure 116, one of the exposures 210(1), 210(2), and/or the first exposure image frame 208(1). A second exposure of the sensor data 310 may correspond to the second exposure 118, one of the exposures 210(3), 210(4), and/or the second exposure image frame 208(2), discussed above.

In the example 304, the intensity data 312 is illustrated as an intensity image 316 and the depth data 314 is illustrated as a depth image 318. The intensity image 316 represent an intensity (e.g., brightness) of sensed objects in the scene on a pixel-by-pixel basis. More specifically, the intensity image 316 includes an array of intensity pixels 320, e.g., corresponding in location to individual pixels of a receiver (e.g., the receiver 112) of the time-of-flight sensor(s) 308. Similarly, the depth image 318 includes an array of depth pixels 322, e.g., corresponding in location to individual pixels of a receiver (e.g., the receiver 112) of the time-of-flight sensor(s) 308. In the intensity image 316 relatively lighter pixels may represent higher intensity and relatively darker pixels may represent lower intensity. In the depth image 318, relatively lighter pixels may represent relatively closer surfaces (e.g., shorter ranges) and relatively darker pixels may represent relatively farther away surfaces (e.g., longer ranges).

From the intensity pixels 320, a first object 324 and a second object 326 are visible. In the example, the first object 324 may be a street sign, and the second object 326 may be a vehicle. From the depth image 318, it will be appreciated that returns associated with the second object 326 indicate most of the second object 326 at some distance, but a small section of the second object 326 appears to be relatively close to the sensor(s) 308. Comparing the intensity image 316 to the depth image 318, it is apparent that the section of the second object 326 that appears to be relatively closer to the sensor(s) 308 is associated with a highly reflective portion of the second object 326, e.g., a retroreflective license plate. Similarly, the first object 324 appears, from the depth image 318, to be relatively close to the sensor(s) 308. In actuality, the first object is a farther distance. Comparing the intensity image 316 and the depth image 318, it is apparent that the first object is a highly-reflective object, e.g., a retroreflector. Thus, in the example 304, the depth image 318 includes first erroneous pixels 328 comprising pixels associated with the first object 324 and second erroneous pixels 330 comprising pixels associated with the second object 326.

The erroneous pixels 328, 330 are pixels that have an incorrect depth or range measurement. In examples, the erroneous pixels 328, 330 may have depths that are determined using one of the second depth determination techniques 132, discussed above, and/or depths that are determined as nominal depths, e.g., by the sensor(s) 308. As will be appreciated, the erroneous pixels 328, 330 may have a negative effect on control of the autonomous vehicle 306. For example, when an object is detected to be (much) closer than it actually is, the vehicle 306 may be required to perform maneuvers that may be unsafe, inefficient, and/or uncomfortable for passengers. Techniques described herein may include identifying the erroneous pixels and determining an actual depth of those pixels, e.g., using a different depth determination technique, such as the first depth determination technique 130.

At an operation 332, the process 300 includes identifying high intensity pixels in the intensity data. An example 334 accompanying the operation 332 illustrates the intensity image 316. In the example 334, the intensity image 316 is illustrated as including first high intensity pixels 336 and second high intensity pixels 338. In the example, the first high intensity pixels 336 are associated with the first object 324, and the second high intensity pixels are associated with the second object 326. In examples, the intensity thresholding component 122 can perform the operation 332, according to the functionality described above. For instance, the operation 332 can include performing global intensity thresholding or local intensity thresholding.

Optionally, the operation 332 may also include determining pixels that correspond to the high intensity pixels 336, 338. In the example 334, first corresponding pixels 340 are illustrated as being associated with the first high intensity pixels 336, and second corresponding pixels 342 are illustrated as being associated with the second high intensity pixels. In examples, the corresponding pixels 340, 342 may be determined by the pixel subset determination component 124, e.g., using the processes and techniques described above. Without limitation, the corresponding pixels 340, 342 can be determined as pixels that are adjacent, proximate, and/or neighboring the high intensity pixels 336, 338. In other examples, a mathematical method, such as a fast marching method, may be used to determine the corresponding pixels, e.g., based at least in part on the high intensity pixels 336, depth information, intensity information, and/or the like. Conceptually, the corresponding pixels may correspond to pixels that are affected by glare or blooming when light reflects off the highly reflective objects 324, 326, which may cause erroneous depth measurements. In some instances, the corresponding pixels 340, 342, may be the "additional" pixels discussed above in the context of FIG. 1. The corresponding pixels 340, 342 may not appear as high intensity pixels in the intensity image.

At an operation 344, the process 300 includes determining a disambiguated depth of the high intensity pixel(s). For example, because the high intensity pixels 336, 338 (and the corresponding pixels 340, 342) may be prone to improper depth determinations using some depth determination techniques, the operation 344 may perform a depth determination technique, like the first technique 130 discussed above, to determine the depth of one or more of those pixels with a higher degree of certainty. An example 346 accompanying the operation 344 illustrates that the depth data 314 can include depth data from a first exposure 348 and a second exposure 350. For example, the first exposure 348 may correspond to the first exposure 116 and the second exposure 350 may correspond to the second exposure 118. The exposures 348, 350 may be generated at different modulation frequencies, as discussed above. As also illustrated in the example 346, a disambiguation technique 352, e.g., implementing the Chinese Remainder Theorem, is used to determine a disambiguated depth 354 for the high intensity pixels 336, 338 and/or the corresponding pixels 340, 342. In examples, the operation 344 can include determining the disambiguated depth 354 for each of the high intensity pixels 336, 338, and each of the corresponding pixels 340, 342, or the operation 344 can include determining the disambiguated depth 354 for fewer than all of the pixels. In examples, the disambiguation technique 352 may be the first technique 130 discussed above.

At an operation 356, the process 300 includes generating composite sensor data. An example 358 accompanying the operation 356 shows a composite depth image 360 as an example of such composite sensor data. The composite depth image 360 includes a plurality of disambiguated depth pixels 362 in place of the erroneous pixels 328, 330 shown in the depth image 318. The disambiguated depth pixels 362 are depth pixels having the disambiguated depths 354 determined by the operation 344, e.g., pixels associated with the high intensity pixels 336, 338 and/or the corresponding pixels 340, 342. In the example 358, pixels associated with the first object 324, e.g., the street sign, are shown at their actual depth, instead of the erroneous, much closer depth. Similarly, pixels associated with the second object 326, e.g., the license plate of the vehicle, are shown at a depth corresponding to the depth of the vehicle, instead of the erroneous, much closer depth.

Also in the composite depth image 360, pixels other than the disambiguated depth pixels 362, e.g., pixels not corresponding to the high-intensity pixels 336, 338 and/or to the corresponding pixels 340, 342, are represented as measured depth pixels 364. The measured depth pixels 364 are depth pixels having a measured intensity determined according to a second technique, e.g., the second technique 132 discussed above. In some examples, the measured depth pixels 364 may have values corresponding to the depth pixels 322.

Although the example of FIG. 3 illustrates the composite sensor data as the composite depth image 360, the composite sensor data generated at the operation 356 can include intensity information and/or an intensity image.

Figure 4:
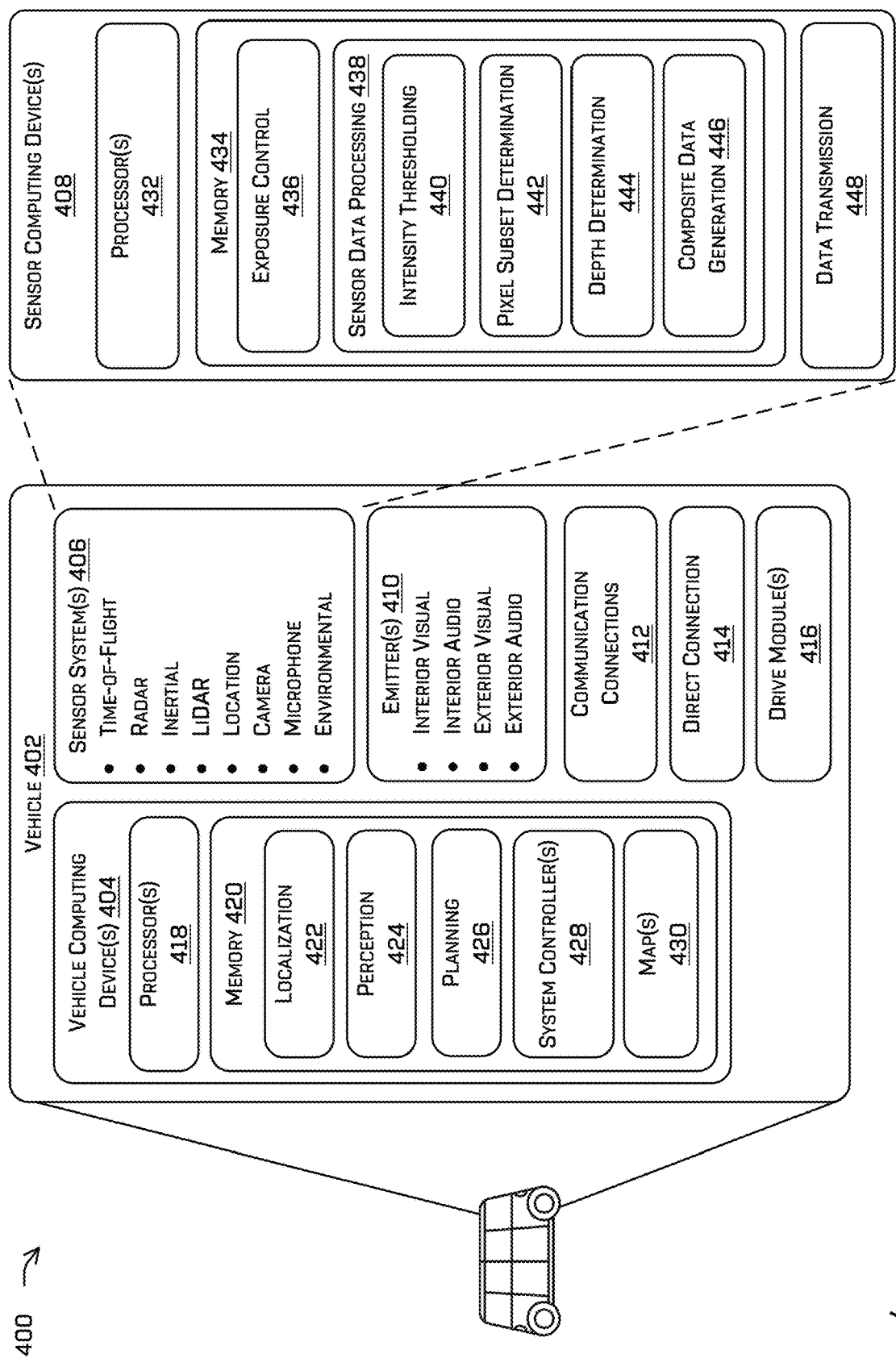
FIG. 4 depicts a block diagram of an example computing system for controlling sensors, such as time-of-flight sensors, using multiple exposures, as described herein.

FIG. 4 depicts a block diagram of an example system 400 for implementing the techniques discussed herein. In at least one example, the system 400 can include a vehicle 402, which can be similar to (or the same as) the vehicle 102 described above with reference to FIG. 1. In the illustrated example 400, the vehicle 402 is an autonomous vehicle; however, the vehicle 402 can be any other type of vehicle.

The vehicle 402 can include one or more vehicle computing devices 404, one or more sensor systems 406, which may include one or more sensor computing devices 408, one or more emitter(s) 410, one or more communication connections 412, at least one direct connection 414 (e.g., for physically coupling with the vehicle 402 to exchange data and/or to provide power), and one or more drive modules 416. In some instances, the vehicle 402 can include more or fewer instances of the vehicle computing device(s) 404. The sensor system(s) 406 can be configured to capture sensor data associated with an environment. In examples, the sensor system(s) 406 can include the sensor system(s) 104.

The vehicle computing device(s) 404 can include one or more processors 418 and memory 420 communicatively coupled with the one or more processors 418. In at least one instance, the processor(s) 418 can be similar to the processor(s) 106 and the memory 420 can be similar to the memory 108 described above with reference to FIG. 1. In the illustrated example, the memory 420 of the vehicle computing device(s) 404 stores a localization component 422, a perception component 424, a planning component 426, one or more system controllers 428, and one or more maps 430. Though depicted as residing in the memory 420 for illustrative purposes, it is contemplated that the localization component 422, the perception component 424, the planning component 426, and/or the system controller(s) 428 can additionally, or alternatively, be accessible to the vehicle computing device(s) 404 (e.g., stored in a different component of vehicle 402 and/or stored remotely).

In at least one example, the localization component 422 can include functionality to receive data from the sensor system(s) 406 to determine a position of the vehicle 402. In examples, received data can include a depth image and/or an intensity image. In other implementations, the localization component 422 can include and/or request/receive a three-dimensional map, e.g., of the map(s) 430 of an environment and can continuously determine a location of the autonomous vehicle within the map. In some instances, the localization component 422 can use SLAM (simultaneous localization and mapping) or CLAMS (calibration, localization and mapping, simultaneously) to receive image data, such as from the time-of-flight sensor, LiDAR data, RADAR data, SONAR data, IMU data, GPS data, wheel encoder data, or any combination thereof, and the like to accurately determine a location of the autonomous vehicle 402. In some instances, the localization component 422 can provide data to various components of the vehicle 402 to determine an initial position of an autonomous vehicle for generating a candidate trajectory, as discussed herein.

In some examples, the perception component 424 can include functionality to perform object detection, segmentation, and/or classification. In some examples, the perception component 424 can receive data and generate processed sensor data that indicates a presence of an object in the environment of, e.g., proximate, the vehicle 402 and/or a classification of the object as an object type (e.g., car, pedestrian, cyclist, building, tree, road surface, curb, sidewalk, unknown, etc.). In additional and/or alternative examples, the perception component 424 can provide processed sensor data that indicates one or more characteristics associated with a detected object and/or the environment in which the object is positioned. In some examples, characteristics associated with an object can include, but are not limited to, an x-position (global position), a y-position (global position), a z-position (global position), an orientation, an object type (e.g., a classification), a velocity of the object, an extent of the object (size), or the like. Characteristics associated with the environment can include, but are not limited to, a presence of another object in the environment, a state of another object in the environment, a time of day, a day of a week, a season, a weather condition, an indication of darkness/light, etc.

In some instances, the planning component 426 can determine a path for the vehicle 402 to follow to traverse through an environment. For example, the planning component 426 can determine various routes and trajectories and various levels of detail. In some examples, the planning component 426 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 426 can generate an instruction for guiding the autonomous vehicle along at least a portion of the route from the first location to the second location. In at least one example, the planning component 426 can determine how to guide the autonomous vehicle from a first waypoint in the sequence of waypoints to a second waypoint in the sequence of waypoints. In some examples, the instruction can be a trajectory, or a portion of a trajectory. In some instances, multiple trajectories can be substantially simultaneously generated (i.e., within technical tolerances) in accordance with a receding horizon technique. A single trajectory of the multiple trajectories in a receding horizon having the highest confidence level may be selected to operate the vehicle.

In other examples, the planning component 426 can alternatively, or additionally, use data from the perception component 424 to determine a path for the vehicle 402 to follow to traverse through an environment. For example, the planning component 426 can receive data from the perception component 424 regarding objects associated with an environment. Using this data, the planning component 426 can determine a route to travel from a first location (e.g., a current location) to a second location (e.g., a target location) to avoid objects in an environment.

As noted above, the vehicle computing device(s) 404 can include the system controller(s) 428, which can be configured to control steering, propulsion, braking, safety systems, emitters, communication systems, and/or other systems of the vehicle 402. The system controller(s) 428 can communicate with and/or control corresponding systems of the drive module(s) 416 and/or other components of the vehicle 402, which may be configured to operate in accordance with a trajectory provided from the planning component 426.

In some examples, the map(s) 430 can be stored on a remote computing device. Multiple maps 430 can be stored based on, for example, a characteristic (e.g., type of entity, time of day, day of week, season of the year, etc.). Storing multiple maps 430 can have similar memory requirements, but increase the speed at which data in a map can be accessed.

In at least one example, the sensor system(s) 406 can be similar to the sensor system(s) 104 described above with reference to FIG. 1. The sensor system(s) 406 can include time-of-flight sensors, location sensors (e.g., GPS, compass, etc.), inertial sensors (e.g., inertial measurement units (IMUs), accelerometers, magnetometers, gyroscopes, etc.), LIDAR sensors, RADAR sensors, SONAR sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 406 can include multiple instances of each of these or other types of sensors. For instance, the time-of-flight sensors can include individual time-of-flight sensors located at the corners, front, back, sides, and/or top of the vehicle 402. As another example, the camera sensors can include multiple cameras disposed at various locations about the exterior and/or interior of the vehicle 402. The sensor system(s) 406 can provide input to the vehicle computing device(s) 404.

The sensor system(s) 406 can include the sensor computing device(s) 408, which can include one or more processors 432 and memory 434 communicatively coupled with the one or more processors 432. The one or more processors 432 can be similar to the processor(s) 106 and/or to the processor(s) 418, described above. The memory 434 can be similar to the memory 108 and/or to the memory 420, described above. In the illustrated example, the memory 434 of the sensor computing device(s) 408 can store an exposure control system 436 and a sensor data processing system 438. The sensor data processing system 438 can include an intensity thresholding component 440, a pixel subset determination component 442, a depth determination component 444, and a composite data generation component 446. Though depicted as residing in the memory 434 for illustrative purposes, it is contemplated that the foregoing components can additionally, or alternatively, be accessible to the sensor system(s) 406 (e.g., stored in a different component of vehicle 402 and/or stored remotely). Moreover, although the sensor data processing system 438 (as well as its associated components) is illustrated as being stored in and/or part of the sensor computing device(s) 408, in other implementations any or all of these components may be stored in the memory 420 and/or in some other, not illustrated memory, such as a remote memory associated with a remote computing device. That is, although FIG. 4 illustrates several components as being part of the sensor computing device(s) 408 of the sensor system(s) 406, the processing associated with any or all of those components may be performed other than at the sensor.

The sensor system(s) 406 may output raw data, e.g., phase values, as discussed above, for processing in accordance with functionality ascribed herein to one or more of the sensor data processing system 438 or the associated components, but that processing may be performed other than at the location of the emitter and the receiver. Without limitation, the sensor system(s) 406 can include on-board processing capabilities to perform any or all functionality described herein and associated with generating composite data as described herein. Alternatively, processing of the sensor data may be processed other than at the sensor system(s) 406.

Components of the sensor computing device(s) 408 may be configured to generate and/or process data in many formats. For example, and as noted above, the sensor computing device(s) 408 can measure a phase shift between the carrier and the response carrier and/or perform numerical integration calculations to determine the sensor data in the quadrature format. In other examples, the sensor computing device(s) 408 can determine an intensity and depth format of the sensor data, e.g., generate the depth and intensity images. For purposes of illustration only, the sensor system(s) 406 can determine the sensor data in the intensity and depth format where an individual pixel in the sensor data is associated with an 8-bit value for the intensity and a 12-bit value for the depth.

The exposure control system 436 can be configured to generate sensor data, e.g., exposures, at different sensor system settings. In examples described herein, the exposure control system 436 can adjust power, exposure time, and/or the like, to generate a short exposure and a long exposure. The exposure control system 436 can also adjust a modulation frequency of a carrier signal to generate exposures at different modulation frequencies.

The sensor data processing system 438 can generate composite data from multiple exposures. For instance, the sensor data processing system 438 can correspond to the sensor data processing system 120 detailed above. Without limitation, the sensor data processing system 438 can receive multiple exposures, e.g., including image and/or depth information. The sensor data processing system 438 includes functionality to generate and output composite data from the exposures, as detailed herein.

The intensity thresholding component 440 can include functionality to identify high intensity pixels. As detailed herein, high intensity pixels may result from highly reflective surfaces, which can cause glare, blooming, and other events that can lead to inaccurate depth measurements for such pixels. The intensity thresholding component 440 can determine pixels that are above a threshold intensity and/or perform local thresholding to identify pixels in a group, e.g., a line, column, region, or the like, that have a high intensity relative to other pixels. Without limitation, the intensity thresholding component 440 can correspond to the intensity thresholding component 122.

The pixel subset determination component 442 can include functionality to determine additional pixels, e.g., pixels that correspond to the high intensity pixels determined by the intensity thresholding component. The pixel subset determination component 442 can correspond to the pixel subset determination component 124, detailed above.

The depth determination component 444 can include functionality to determine depths of pixels, e.g., from depth information generated by a time-of-flight sensor. The depth determination component 444 can implement multiple depth determination techniques, e.g., a first technique to determine a disambiguated depth of the high intensity pixels and a second technique to determine a measured depth of pixels other than the high intensity pixels (and/or any corresponding or additional pixels identified by the pixel subset determination component 442. Without limitation, the depth determination component 444 can correspond to the depth determination component 126.

The composite data generation component 446 can correspond to the composite data generation component 128, discussed above. For example, the composite data generation component 446 can generate a depth image that includes values based on depths measured over multiple exposures.

The sensor computing device(s) 408 of the sensor system(s) 406 can also include a data transmission component 448. The data transmission component 448 can transmit the sensor data, e.g., composite sensor data, from the sensor computing device(s) 408, e.g., to the localization component 422, the perception component 424, and/or the planning component 426.

The emitter(s) 410 are configured for emitting light and/or sound, as described above. In the illustrated example, the emitter(s) 410 can include interior visual and/or interior audio emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 410 in this example also include exterior emitters, which may be exterior visual and/or exterior audio emitters. By way of example and not limitation, the exterior emitters in this example can include lights to signal a direction of travel or other indicator of vehicle action (e.g., indicator lights, signs, light arrays, etc.) and one or more audio emitters (e.g., speakers, speaker arrays, horns, etc.) to audibly communicate with pedestrians or other nearby vehicles, one or more of which may comprise acoustic beam steering technology.

The communication connection(s) 412 enable communication between the vehicle 402 and one or more other local or remote computing device(s), including the sensor computing device(s) 408. For instance, the communication connection(s) 412 can facilitate communication with other local computing device(s) on the vehicle 402 and/or the drive module(s) 416. Also, the communication connection(s) 412 can allow the vehicle to communicate with other nearby computing device(s) (e.g., other nearby vehicles, traffic signals, etc.). The communications connection(s) 412 can also enable the vehicle 402 to communicate with a remote teleoperations computing device or other remote services.

The communications connection(s) 412 can include physical and/or logical interfaces for connecting the vehicle computing device(s) 404 to another computing device or an external network (e.g., the Internet). For example, the communications connection(s) 412 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In some examples, the drive module(s) 416 can include a single drive module 416. In other examples, the vehicle 402 can have multiple drive modules, and individual drive modules 416 can be positioned on opposite ends of the vehicle 402 (e.g., the front and the rear, etc.). In at least one example, the drive module(s) 416 can include one or more sensor systems to detect conditions of the drive module(s) 416 and/or the surroundings of the vehicle 402. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LiDAR sensors, RADAR sensors, etc. Some sensors, such as the wheel encoders can be unique to the drive module(s) 416. In some cases, the sensor system(s) on the drive module(s) 416 can overlap or supplement corresponding systems of the vehicle 402 (e.g., the sensor system(s) 406).

The drive module(s) 416 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 416 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 416. Furthermore, the drive module(s) 416 also include one or more communication connection(s) that enable communication by the respective drive module with one or more other local or remote computing device(s).

The processor(s) 418 of the vehicle 402, the processor(s) 432 of the sensor computing device(s) 408, and/or the processor(s) 106 of the sensor system(s) 104 can be any suitable processor capable of executing instructions to process data and perform operations as described herein. By way of example and not limitation, the processor(s) 418, 432, 106 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 420, 434, 108 are examples of non-transitory computer-readable media. The memory 420, 434, 108 can store an operating system and one or more software applications, instructions, programs, and/or data to implement the methods described herein and the functions attributed to the various systems. In various implementations, the memory 420, 434, 108 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 420, 434, 108 can be implemented as a neural network. As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can use machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Figure 5:
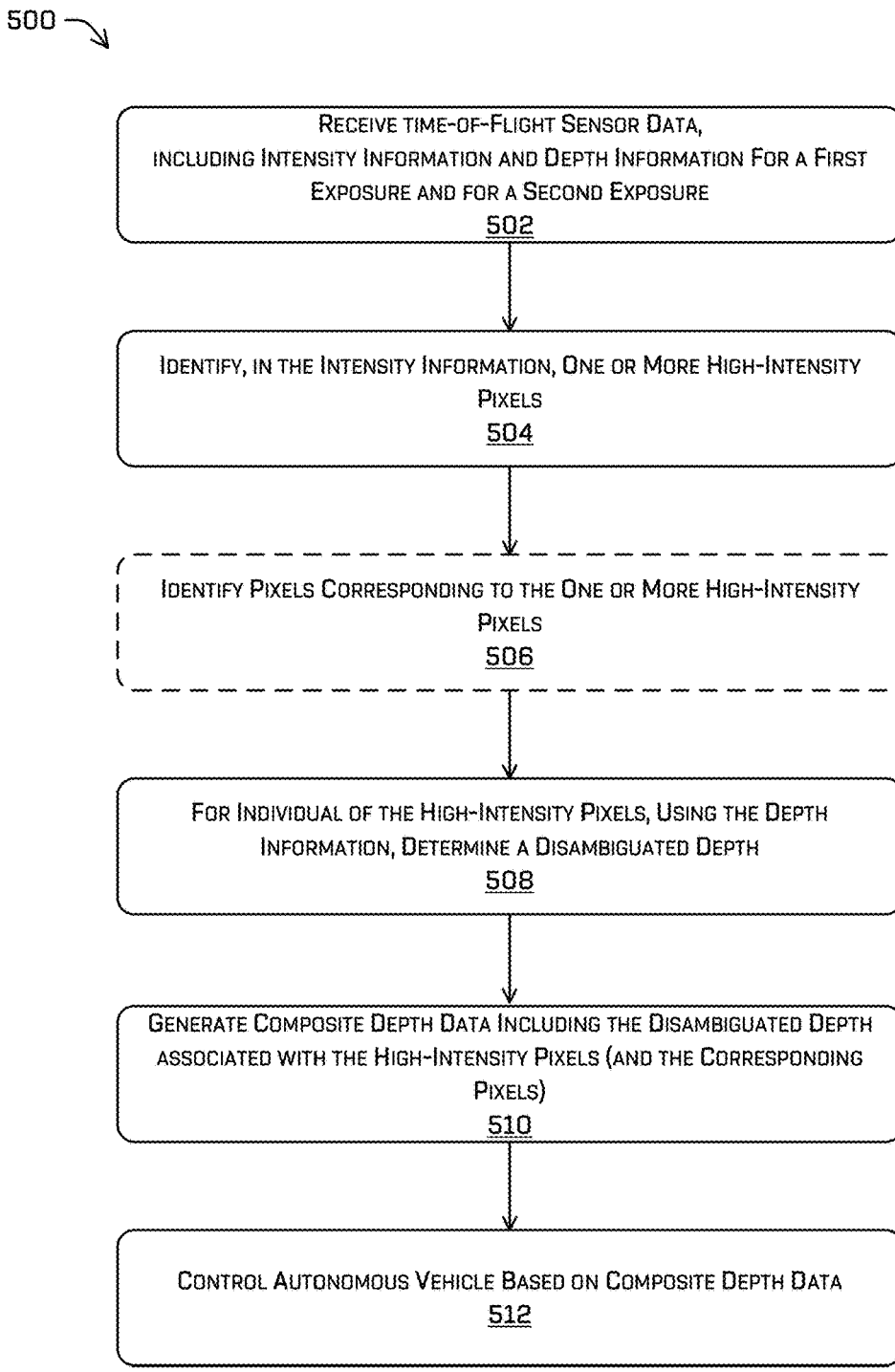
FIG. 5 is a flowchart illustrating an example method for generating composite data and controlling a vehicle relative to obstacles represented in the composite data, as described herein.

FIG. 5, and FIG. 3 discussed above, illustrate example processes in accordance with aspects of the disclosure. The processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

In more detail, FIG. 5 depicts an example process 500 for controlling a vehicle, such as an autonomous vehicle using sensor data from a time-of-flight sensor. For example, some or all of the process 500 can be performed by the vehicle 102, the sensor system(s) 104, and/or by one or more components illustrated in FIG. 4, as described herein. For example, some or all of the process 500 can be performed by the sensor computing device(s) 408 of the sensor system(s) 406. However, the process 500 is not limited to being performed by these components, and the components are not limited to performing the process 500.

At an operation 502, the process can include receiving time-of-flight sensor data, including depth and intensity information for a first exposure and for a second exposure. The first exposure can be captured at a first modulation frequency. The second exposure can be captured at a second modulation frequency. The first exposure and/or the second exposure can be exposure image frames, e.g., generated from combining two or more exposures, as detailed further herein. The sensor data may include a depth image containing per-pixel depth values and an intensity image containing per-pixel intensity values. In still further embodiments the sensor data may be a representation of the environment, e.g., an image of the environment, generated using data from the time-of-flight sensor and/or data generated based on the data from the time-of-flight sensor.

At an operation 504, the process 500 can include identifying, in the intensity information, high intensity pixels. The operation 504 can include identifying pixels in an intensity image that have an intensity that meets or exceed a threshold intensity. In other examples, the operation 504 can include a localized thresholding, e.g., in which high intensity pixels are identified relative to other pixels in a localized region of the intensity image.

At an operation 506, the process 500 optionally includes identifying pixels corresponding to the one or more high-intensity pixels. For example, the corresponding or additional pixels may be identified as pixels that neighbor or are proximate to the high intensity pixels identified at the operation 504. In other examples, the corresponding or additional pixels can be identified using a mathematical process, such as a fast marching method, or the like.

At an operation 508, the process 500 can include determining, for individual of the high-intensity pixels and using the depth information, a disambiguated depth. For example, the operation 508 can include performing a disambiguation technique, such as a technique including the Chinese Remainder Theorem, to determine depths of the high intensity pixels. The disambiguation technique can use data from multiple exposures, taken at different modulation frequencies. In examples, the operation 508 can also include determining depths for individual of the additional or corresponding pixels identified at the operation 506. The technique used at the operation 508 to determine the disambiguated depth(s) may be a higher-certainty technique.

At an operation 510, the process 500 can include generating composite depth data including the disambiguated depth associated with the high-intensity pixels (and the corresponding pixels). The operation 510 can also include associated a measured depth with pixels other than the high intensity pixels (and the corresponding pixels). The measured depth is determined using a second depth determination technique, e.g., different from the technique used at the operation 508.

At operation 512, the process 500 can include controlling an autonomous vehicle based on the composite depth data. In some instances, a vehicle computing system can, based on the composite data, and in some instances additional sensor data (e.g., LiDAR data, radar data, vision data), determine a trajectory relative to object(s) identified in the composite data. For example, the planning component 426 of the vehicle computing device(s) 404 can further determine relative movement, e.g., velocity and acceleration, of objects in the environment using one or more sensor modalities, object classification data, and the maps and/or other information to determine the trajectory. For example, the trajectory may define at least a portion of a travel path for the vehicle. In some examples, the trajectory and/or travel path may be based at least in part on fused data including data from one or more sensor modalities, including a time-of-flight sensor, LiDAR, radar, or the like. The operation 512 can include generating commands that can be relayed to a controller onboard an autonomous vehicle to control the autonomous vehicle to drive the travel path. Although discussed in the context of an autonomous vehicle, the process 500, and the techniques and systems described herein, can be applied to a variety of systems utilizing sensors.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks, or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

EXAMPLE CLAUSES

A: An example vehicle includes: a time-of-flight sensor configured to generate data based on light received at a receiver of the time-of-flight sensor; one or more processors; and non-transitory memory storing processor-executable instructions that, when executed by the one or more processors, configure the vehicle to perform actions comprising: receiving, from the time-of-flight (ToF) sensor, first ToF data corresponding to a first exposure time associated with a first modulation frequency of the ToF sensor, the first ToF data including first depth data for a plurality of pixels; receiving, from the ToF sensor, second ToF data corresponding to a second exposure time associated with a second modulation frequency of the ToF sensor, the second ToF data including second depth data for the plurality of pixels; determining, from intensity data associated with the plurality of pixels, high intensity pixels of the plurality of pixels; determining, using a first depth determination technique, at least a portion of the first depth data associated with the high intensity pixels, and at least a portion of the second depth data associated with the high intensity pixels, disambiguated depth data associated with the high intensity pixels; identifying a group of pixels including the high intensity pixels; determining, using a second depth determination technique different from the first depth determination technique, a measured depth associated with a subset of the plurality of pixels other than the group of pixels including the high intensity pixels; and generating composite sensor data that associates the disambiguated depth data with the group of pixels including the high intensity pixels and the measured depth with the subset of the plurality of pixels other than the group of pixels including the high intensity pixels.

B: The vehicle of example A, wherein the intensity data comprises an intensity image and the determining the high intensity pixels comprises: comparing intensity values for pixels in the intensity data to a threshold intensity; and determining the high intensity pixels as the pixels having corresponding intensity values equal to or exceeding the threshold intensity.

C: The vehicle of example A or example B, wherein the determining the high intensity pixels comprises: determining, for a row of intensity pixels in the intensity data, one or more pixels having a highest intensity in the row; and determining the high intensity pixels to be the one or more pixels.

D: The vehicle of any one of example A through example C, wherein the first depth determination technique is based at least in part on the Chinese remainder theorem.

E: The vehicle of any one of example A through example D, wherein: the second depth determination technique comprises selecting the depth from a measured depth associated with the first ToF data or the second ToF data.

F: The vehicle of any one of example A through example E, the actions further comprising: generating, based at least in part on the composite sensor data, one or more trajectories for traversing an environment; and controlling the vehicle based at least in part on the one or more trajectories.

G: An example method includes: receiving, from a time-of-flight sensor, first sensor data corresponding to a first modulation frequency and including first depth information for pixels of a receiver of the time-of-flight sensor; receiving, from the time-of-flight sensor, second sensor data corresponding to a second modulation frequency and including second depth information for the pixels; a) determining a high intensity pixel of the pixels; determining, using a first depth determination technique, the portion of the first depth information associated with the high intensity pixel, and the portion of the second depth information associated with the high intensity pixel, a disambiguated depth of the high intensity pixel; determining, using a second depth determination technique, a measured depth of one or more of the pixels other than the high intensity pixel; and generating composite sensor data that associates the disambiguated depth with the high intensity pixel and the measured depth with the one or more of the pixels other than the high intensity pixel.

H: The method of example G, further comprising: determining a group of pixels associated with the high intensity pixel; and associating the disambiguated depth with the group of pixels.

I: The method of example G or example H, wherein the group of pixels include pixels other than high intensity pixels.

J: The method of any one of example G through example I, wherein the determining the group of pixels comprises: implementing a fast marching method based at least in part on the high intensity pixel and at least one of the first depth information or the second depth information.

K: The method of any one of example G through example J, wherein: the composite sensor data comprises a depth map; and the measured depth is a nominal depth determined from at least one of the first depth information or the second depth information associated with the one or more of the pixels other than the high intensity pixel.

L: The method of any one of example G through example K, wherein the determining the high intensity pixel comprises: comparing intensity values associated with the pixels to a threshold intensity; and determining the high intensity pixel as a pixel having a corresponding intensity value equal to or exceeding the threshold intensity.

M: The method of any one of example G through example L, wherein the determining the high intensity pixel comprises: determining, for a line of intensity pixels in intensity information associated with the pixels, a pixel having a highest intensity in the line; and determining the high intensity pixel to be the pixel.

N: The method of any one of example G through example M, wherein the determining the pixel having the highest intensity further comprises: determining that the pixel having the highest intensity meets or exceeds a threshold intensity above an average intensity for pixels in the line.

O: The method of any one of example G through example N, wherein the determining the disambiguated depth is based at least in part on the Chinese Remainder Theorem.

P: One or more example non-transitory computer-readable media storing instructions that, when executed, cause one or more processors to perform operations comprising: receiving, from a time-of-flight sensor, first sensor data corresponding to a first modulation frequency and including first depth information for pixels of a receiver of the time-of-flight sensor; receiving, from the time-of-flight sensor, second sensor data corresponding to a second modulation frequency and including second depth information for the pixels; determining a high intensity pixel of the pixels; determining, using a first depth determination technique, the portion of the first depth information associated with the high intensity pixel, and the portion of the second depth information associated with the high intensity pixel, a disambiguated depth of the high intensity pixel; determining, using a second depth determination technique, a measured depth of one or more of the pixels other than the high intensity pixel; and generating composite sensor data that associates the disambiguated depth with the high intensity pixel and the measured depth with the one or more of the pixels other than the high intensity pixel.

Q: The one or more non-transitory computer-readable media of example P, the operations further comprising: determining a group of pixels associated with the high intensity pixel; and associating the disambiguated depth with additional pixels in the group of pixels.

R: The one or more non-transitory computer-readable media of example P or example Q, wherein: the composite sensor data comprises a depth map; and the measured depth is a nominal depth determined from at least one of the first depth information or the second depth information associated with the one or more of the pixels other than the high intensity pixel.

S: The one or more non-transitory computer-readable media of any one of example P through example R, wherein the determining the high intensity pixel comprises: comparing intensity values associated with the pixels to a threshold intensity; and determining the high intensity pixel as a pixel having a corresponding intensity value equal to or exceeding the threshold intensity.

T: The one or more non-transitory computer-readable media of any one of example P through example S, wherein the first depth determination technique is based at least in part on the Chinese Remainder Theorem.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

We claim:

1. A vehicle comprising:
   a time-of-flight sensor configured to generate data based on light received at a receiver of the time-of-flight sensor;
   one or more processors; and
   non-transitory memory storing processor-executable instructions that, when executed by the one or more processors, configure the vehicle to perform actions comprising:
   receiving, from the time-of-flight (ToF) sensor, first ToF data corresponding to a first exposure time associated with a first modulation frequency of the ToF sensor, the first ToF data including first depth data for a plurality of pixels;
   receiving, from the ToF sensor, second ToF data corresponding to a second exposure time associated with at a second modulation frequency of the ToF sensor, the second ToF data including second depth data for the plurality of pixels;
   determining, from intensity data associated with the plurality of pixels, high intensity pixels of the plurality of pixels;
   determining, using a first depth determination technique, at least a portion of the first depth data associated with the high intensity pixels, and at least a portion of the second depth data associated with the high intensity pixels, disambiguated depth data associated with the high intensity pixels;

identifying a group of pixels including the high intensity pixels;
determining, using a second depth determination technique different from the first depth determination technique, a measured depth associated with a subset of the plurality of pixels other than the group of pixels including the high intensity pixels; and
generating composite sensor data that associates the disambiguated depth data with the group of pixels including the high intensity pixels and the measured depth with the subset of the plurality of pixels other than the group of pixels including the high intensity pixels.

2. The vehicle of claim 1, wherein the intensity data comprises an intensity image and the determining the high intensity pixels comprises:
comparing intensity values for pixels in the intensity data to a threshold intensity; and
determining the high intensity pixels as the pixels having corresponding intensity values equal to or exceeding the threshold intensity.

3. The vehicle of claim 1, wherein the determining the high intensity pixels comprises:
determining, for a row of intensity pixels in the intensity data, one or more pixels having a highest intensity in the row; and
determining the high intensity pixels to be the one or more pixels.

4. The vehicle of claim 1, wherein the first depth determination technique is based at least in part on the Chinese remainder theorem.

5. The vehicle of claim 1, wherein:
the second depth determination technique comprises selecting the depth from a measured depth associated with the first ToF data or the second ToF data.

6. The vehicle of claim 1, the actions further comprising:
generating, based at least in part on the composite sensor data, one or more trajectories for traversing an environment; and
controlling the vehicle based at least in part on the one or more trajectories.

7. A method comprising:
receiving, from a time-of-flight sensor, first sensor data corresponding to a first modulation frequency and including first depth information for pixels of a receiver of the time-of-flight sensor;
receiving, from the time-of-flight sensor, second sensor data corresponding to a second modulation frequency and including second depth information for the pixels;
determining a high intensity pixel of the pixels;
determining, using a first depth determination technique, the portion of the first depth information associated with the high intensity pixel, and the portion of the second depth information associated with the high intensity pixel, a disambiguated depth of the high intensity pixel;
determining, using a second depth determination technique, a measured depth of one or more of the pixels other than the high intensity pixel; and
generating composite sensor data that associates the disambiguated depth with the high intensity pixel and the measured depth with the one or more of the pixels other than the high intensity pixel.

8. The method of claim 7, further comprising:
determining a group of pixels associated with the high intensity pixel; and
associating the disambiguated depth with the group of pixels.

9. The method of claim 8, wherein the group of pixels include pixels other than high intensity pixels.

10. The method of claim 9, wherein:
the composite sensor data comprises a depth map; and
the measured depth is a nominal depth determined from at least one of the first depth information or the second depth information associated with the one or more of the pixels other than the high intensity pixel.

11. The method of claim 8, wherein the determining the group of pixels comprises:
implementing a fast marching method based at least in part on the high intensity pixel and at least one of the first depth information or the second depth information.

12. The method of claim 7, wherein the determining the high intensity pixel comprises:
comparing intensity values associated with the pixels to a threshold intensity; and
determining the high intensity pixel as a pixel having a corresponding intensity value equal to or exceeding the threshold intensity.

13. The method of claim 7, wherein the determining the high intensity pixel comprises:
determining, for a line of intensity pixels in intensity information associated with the pixels, a pixel having a highest intensity in the line; and
determining the high intensity pixel to be the pixel.

14. The method of claim 13, wherein the determining the pixel having the highest intensity further comprises:
determining that the pixel having the highest intensity meets or exceeds a threshold intensity above an average intensity for pixels in the line.

15. The method of claim 7, wherein the determining the disambiguated depth is based at least in part on the Chinese Remainder Theorem.

16. One or more non-transitory computer-readable media storing instructions that, when executed, cause one or more processors to perform operations comprising:
receiving, from a time-of-flight sensor, first sensor data corresponding to a first modulation frequency and including first depth information for pixels of a receiver of the time-of-flight sensor;
receiving, from the time-of-flight sensor, second sensor data corresponding to a second modulation frequency and including second depth information for the pixels;
determining a high intensity pixel of the pixels;
determining, using a first depth determination technique, the portion of the first depth information associated with the high intensity pixel, and the portion of the second depth information associated with the high intensity pixel, a disambiguated depth of the high intensity pixel;
determining, using a second depth determination technique, a measured depth of one or more of the pixels other than the high intensity pixel; and
generating composite sensor data that associates the disambiguated depth with the high intensity pixel and the measured depth with the one or more of the pixels other than the high intensity pixel.

17. The one or more non-transitory computer-readable media of claim 16, the operations further comprising:
determining a group of pixels associated with the high intensity pixel; and
associating the disambiguated depth with additional pixels in the group of pixels.

18. The one or more non-transitory computer-readable media of claim 17, wherein:
the composite sensor data comprises a depth map; and
the measured depth is a nominal depth determined from at least one of the first depth information or the second depth information associated with the one or more of the pixels other than the high intensity pixel.

19. The one or more non-transitory computer-readable media of claim 16, wherein the determining the high intensity pixel comprises:
comparing intensity values associated with the pixels to a threshold intensity; and
determining the high intensity pixel as a pixel having a corresponding intensity value equal to or exceeding the threshold intensity.

20. The one or more non-transitory computer-readable media of claim 16, wherein the first depth determination technique is based at least in part on the Chinese Remainder Theorem.

* * * * *